United States Patent [19]
Lee

[11] Patent Number: 5,628,492
[45] Date of Patent: May 13, 1997

[54] FAUCET CONNECTOR DEVICE

[76] Inventor: Chung H. Lee, 30 Chang Ho Rd., Sec. 1, Chang Hua, Taiwan

[21] Appl. No.: 597,500

[22] Filed: Feb. 2, 1996

[51] Int. Cl.⁶ ..................................................... F16L 29/02
[52] U.S. Cl. ..................... 251/149.1; 137/329.2
[58] Field of Search ............................... 251/155, 149.1, 251/149.4; 137/329.1, 329.2, 801

[56] References Cited

U.S. PATENT DOCUMENTS

| | | | |
|---|---|---|---|
| 1,383,272 | 6/1921 | Woore | 137/329.1 X |
| 5,110,088 | 5/1992 | Shih | 251/149.1 |
| 5,344,119 | 9/1994 | Wang | 251/149.1 |

*Primary Examiner*—Kevin Lee
*Attorney, Agent, or Firm*—David & Raymond; Raymond Y. C. Chan

[57] ABSTRACT

A faucet connector device for connecting between a water supply pipe and a faucet, comprises a connector body, a water stopper and a retaining washer. The connector body is a hollow cylinder with each of its inlet end and outlet end having an inner threaded opening for firmly connecting to the water supply pipe and the faucet respectively. Between the openings of the inlet and outlet ends of the connector body defines an axial long circular channel. One end of the channel which is adjacent to the opening of the inlet end has a countersink opening. The water stopper is disposed inside the connector body and has a solid conical stopper head having an inclined conical surface and a driving shaft extending coaxially from a smaller end of the stopper head, wherein the stopper head and the countersink opening have the same conical slant gradient. The driving shaft is disposed in the channel with the stopper head abutting against the countersink opening. Moreover, at least a water passage is formed along the length of the driving shaft for enabling water flowing from the inlet end of the connector body to the outlet end of the connector body via the passage. The retaining washer is mounted to the free end of the driving shaft so as to hold the water stopper in position. Accordingly, the faucet connector device of the present invention can simplify operations, save maintenance time and expenses and preventing wasting water.

6 Claims, 2 Drawing Sheets

5,628,492

FAUCET CONNECTOR DEVICE

BACKGROUND OF THE PRESENT INVENTION

The present invention relates to faucet, and more particularly to a faucet connector device which enables the user to quickly replace the faucet without shutting off water supply.

In the Prior art technology, a plumber has to close the valve that controls the supply before removing a faucet. After the new faucet is installed, the valve controlling the water supply has to be opened again for testing to determine whether the faucet works or not. In doing so, water remaining in the line must be drained and wasted when the water supply valve is closed and opened again. In fact, such task is usually time consuming and undesirable to most consumers.

In a developed country or industrial society, the saying that time is money never fails. Trades have become highly specialized. At home or in the work place, it is necessary to depend on the "Do-It-Yourself" practice to repair plumbing equipment with small problems because it is expensive and time consuming to hire external help and quite often a maintenance man is nowhere to be found when needed.

Conventionally, a defective faucet in a single real property unit can be replaced when the water main is closed without much difficulty. However for the multi-unit buildings such as apartment buildings and condominiums, it is difficult to locate a single water supply line for a particular faucet and it would certainly cause problems to shut down the water supply for the entire property for replacing a faucet.

SUMMARY OF THE PRESENT INVENTION

A main object of the present invention is to provide a faucet connector device which is mounted between a faucet and a water supply pipe for enabling the user to replace a faucet without shutting off water supply. The present invention can shut off the water supply flow automatically once a defective faucet is disconnected with the faucet connector device. When a new faucet is reconnected to the faucet connector device of the present invention, the water supply flow can be opened again automatically. By installing a faucet connector device of the present invention between the water supply pipe end and the faucet, the time consuming for replacing the faucet can then be save and thus the cost of repairing labor can also be economized by eliminating the process of shutting down the main water supply source. Moreover, the present of this invention can prevent wasting water that must be drained when the water supply valve is closed and opened again.

DETAILED DESCRIPTION OF THE PREFERRED EMBODIMENT

Figure 1:
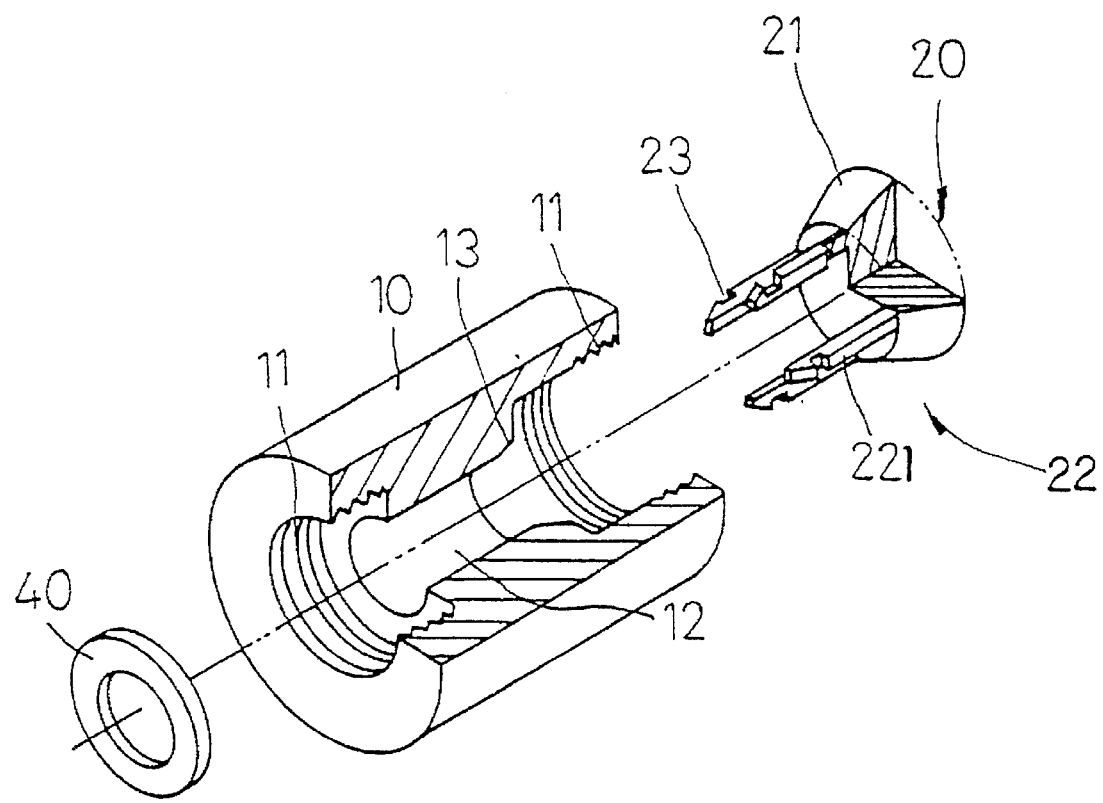
FIG. 1 is a partially sectional exposed view of a preferred embodiment according to the present invention.
Figure 2:
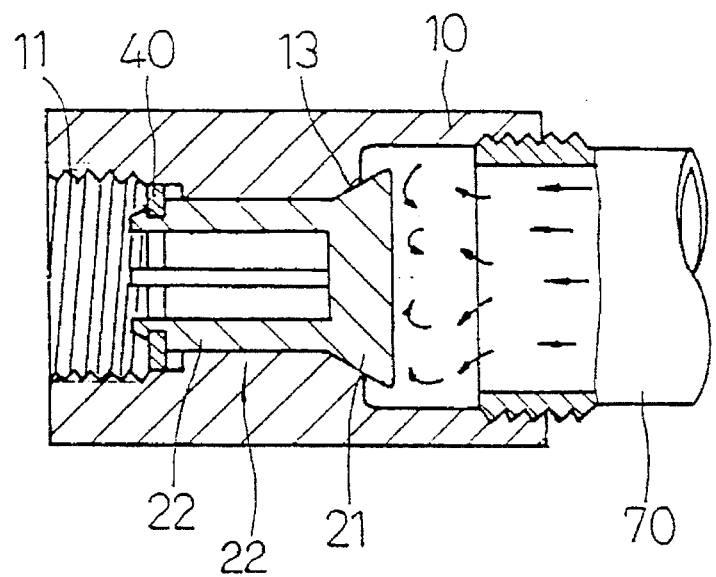
FIG. 2 is a sectional view of the above first embodiment according to the present invention, showing the connection with a water supply pipe.

Referring to FIGS. 1 and 2, a faucet connector device of the present invention comprises a connector body 10, a cylindrical water stopper 20 and a retaining washer 40. The connector body 10 is a hollow cylinder with each of its inlet end and outlet end having an inner threaded opening 11 for firmly connecting to a water supply pipe 70 and a faucet 60 respectively. Between the openings 11 of the inlet and outlet ends of the connector body 10 defines an axial long circular channel 12 having an inner diameter smaller than the openings 11. One end of the channel 12 which is adjacent to the opening 11 of the inlet end has a countersink opening 13. The countersink opening 13 is a conical water stopping hole having a first inclined conical surface.

The cylindrical water stopper 20 is disposed inside the connector body 10 and has a solid conical stopper head 21 having a second inclined conical surface and a driving shaft 22 extending coaxially from a smaller end of the stopper head 21. The other larger end of the stopper head 21 has a diameter larger than the outer diameter of the countersink opening 13. Besides, the stopper head 21 and the countersink opening 13 have the same conical slant gradient. The driving shaft 22 is disposed in the channel 12 with the stopper head 21 abutting against the countersink opening 13. At least a water passage is formed along the length of the driving shaft 22 for enabling water flowing from the inlet end of the connector body 10 to the outlet end of the connector body 10 via the passage.

In according with the first embodiment, the driving shaft 22 has a length longer than the channel 12 so that its free end is extended to the bottom of the opening 11 of the outlet end of the connector body 10. The driving shaft 22 comprises at least two parallel and elongated base rods 221 protruding symmetrically from the smaller end of the stopper head 21. According to the present first embodiment, the driving shaft 22 has four base rods 221 evenly distributed on the circumference of the smaller end of the stopper head 21. Each base rod 221 has a groove 23 positioned at the outer surface near the free end thereof.

The retaining washer 40 is a O-ring washer having an outer diameter larger than the inner diameter of the channel 12 and smaller than inner diameter of outlet opening 11 and is mounted to the free end of the driving shaft 22 so as to hold the water stopper 20 in position. The retaining washer 40 has an inner diameter being equal to the distance between the bases of any two of the grooves 23 of the base rods 221 of the water stopper 20.

It is simple and easy to assemble the first embodiment of the present invention. To assemble, the end of the water stopper 20 with its base rods 221 is inserted into the channel 12 of the connector body 10 through the inlet end opening 11, and then place the retaining washer 40 into the outlet end opening 11 of the connector body 10 and push the retaining washer 40 against the outside of the base rods 221 of the water stopper 20 until the retaining washer 40 is embedded into the grooves 23 of the base rods 221, as shown in FIG. 2.

Figure 3:
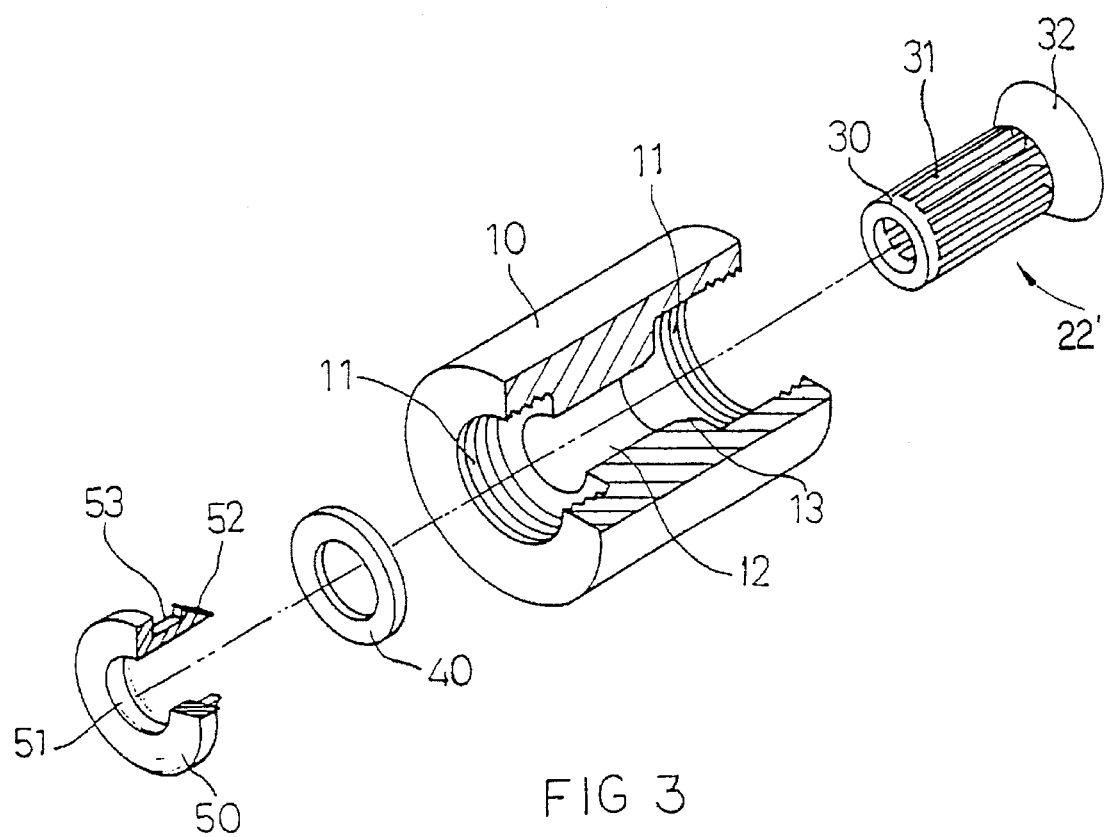
FIG. 3 is a partially sectional exposed view of another preferred embodiment according to the present invention.
Figure 4:
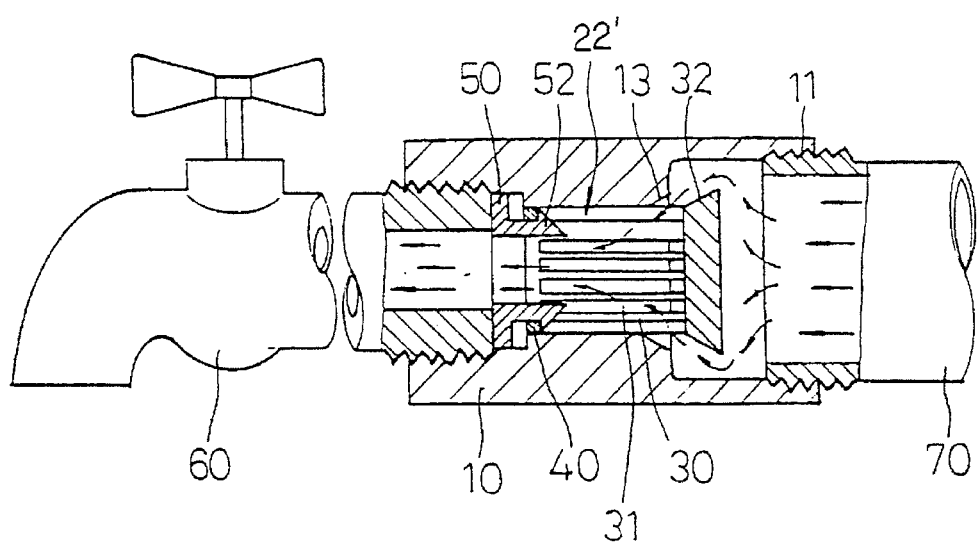
FIG. 4 is a sectional view of the above second embodiment according to the present invention, showing the connection with a faucet and a water supply pipe.

Referring to FIGS. 3 and 4, a second embodiment of the present invention is illustrated. A faucet connector device comprises a connector body 10 having configuration same as the above embodiment respectively, a water stopper 22' having alternative configuration, a pushing seat 50 and a retaining washer 40 having same configuration as in the first embodiment.

The cylindrical water stopper 22' is also disposed inside the connector body 10 and has a solid conical stopper head 32 having a second inclined conical surface and a driving shaft 30 extending coaxially from a smaller end of the stopper head 32. The other larger end of the stopper head 32 has a diameter larger than the outer diameter of the countersink opening 13. Besides, the stopper head 32 and the countersink opening 13 have the same conical slant gradient. The driving shaft 30 is disposed in the channel 12 with the stopper head 32 abutting against the countersink opening 13. At least a water passage is formed along the length of the driving shaft 30 for enabling water flowing from the inlet end of the connector body 10 to the outlet end of the connector body 10 via the passage.

In according with the second embodiment, the driving shaft 30 has a length shorter than or equal to the diameter of the channel 13. The driving shaft 30 is a hollow cylinder having an axial through hole and has a plurality of longitudinal slots 31 on its surface extending from the smaller end of the stopper head 32 to near the free end portion of the driving shaft 30. The longitudinal slots 31 are open to the long circular channel 12 of the connector body 10.

The pushing seat 50 has a central circular hole 51 and at least two arrow shaped legs 52 protruding from one side symmetrically towards the connector body 10. Each of the legs 52 defines a groove 53 at its outer surface for receiving the retaining washer 40.

It is also simple and easy to assemble the second embodiment of the present invention. To assemble such device, first insert the end of the water stopper 22' into the long circular channel 23 of the connector body 10 through the inlet end opening 11 of the connector body 10; secondly, place the retaining washer 40 into the grooves 53 at the legs of the pushing seat 50; finally, push the pushing seat 50 with the retaining washer 40 through the outlet end opening 11 of the connector body 10 until they contact with the water stopper 22' and the legs 52 is embedded into the respective longitudinal slots 31 of the water stopper 22', making a snapping sound, as shown in FIG. 4.

Again referring to FIGS. 2 and 4, for the working mode of the present invention, first connect the inlet end opening 11 of the connector body 10 to a water supply pipe 70. In doing so, the water supply line must be closed or the water main valve must be shut. Secondly, apply some Teflon tape around the threaded part of a faucet 60 and screw it into the outlet end opening 11 of the connector body 10 until the connecting end of the faucet 60 pressing against pushing seat 50 as well as the retaining washer 40 so as to push the water stopper 22 or 22' to move rearward to an open condition that the stopper head 21 or 32 keeps departing away from the countersink opening 13 to form a water passage. Then open the water supply line and water flows into the connector body 10.

Normally, when the water reaches the stopper head 21 or 32, it will flow through the outside of the stopper head 21 or 32 into the channel 12. Thus, the user can drain water by opening the faucet 60.

When the faucet 60 is damaged by wear and tear and is to be removed for repair or replaced, it is no longer necessary to close the water supply for the task. When the faucet 60 is unscrewed from the connector body 10, the water pressure of the inlet water flow through the inlet end opening 11 of the connector body 10 will apply to the larger end surface of the stopper head 21 or 32 and press the water stopper 22 or 22' to move forward, i.e. toward the faucet 60, until the conical surface of the stopper head 21 or 32 is tightly abut against the conical surface of the countersink opening 13 and thus shut off the water supply automatically (as shown in FIG. 2).

Therefore, no water will come out from the outlet end of the connector body 10 when the faucet 60 is removed. When the faucet 60 is reconnected after repaired or a new one is installed, the screw-threaded part of the faucet 60 is gradually screwed into the connector body 10 and thus pushes the water stopper 22 or 22' rearward. At the same time, the stopper head 21 or 32 is pushed to separate from the countersink opening 13; thus water can flow through the space into the connector body 10 and come out from the faucet 60. Accordingly, the faucet connector device of the present invention can simplify operations, save maintenance time and expenses and preventing wasting water.

I claim:

1. A faucet connector device, comprising
a connector body which is a hollow cylinder having an inlet end and an outlet end, each of said inlet end and said outlet end having an inner threaded opening, between said openings of said inlet and outlet ends of said connector body defining an axial long circular channel which has an inner diameter smaller than said openings, wherein one end of said channel which is adjacent to said opening of said inlet end has a countersink opening which is a conical water stopping hole having a first inclined conical surface;
a water stopper, which has a solid conical stopper head having a second inclined conical surface and a driving shaft extending coaxially from a smaller end of said stopper head, wherein said stopper head and said countersink opening have the same conical slant gradient, said driving shaft having an free end and being disposed in said channel with said stopper head abutting against said countersink opening; at least a water passage being formed along said length of said driving shaft for enabling water flowing from said inlet end of said connector body to said outlet end of said connector body via said passage, wherein said driving shaft has a length longer than said channel so that said free end of said driving shaft is extended to a bottom of said opening of said outlet end of said connector body, said driving shaft comprising at least two parallel and elongated base rods protruding symmetrically from the smaller end of said stopper head, wherein each said base rod has a free end and a groove positioned at an outer surface near said free end of said base rods; and
a retaining washer having an outer diameter larger than said inner diameter of said channel and being mounted to an free end of said driving shaft so as to hold said water stopper in position.

2. A faucet connector device as recited in claim 1, in which said driving shaft has four base rods evenly distributed on the circumference of said smaller end of said stopper head.

3. A faucet connector device as recited in claim 1, in which said retaining washer is a O-ring washer having an inner diameter being equal to said distance between said bases of two of said grooves of said base rods of said water stopper, wherein said retaining washer is pushed against the outside of said base rods of said water stopper until said retaining washer is embedded into said grooves of said base rods.

4. A faucet connector device as recited in claim 2, in which said retaining washer is a O-ring washer having an inner diameter being equal to said distance between said bases of two of said grooves of said base rods of said water stopper, wherein said retaining washer is pushed against the outside of said base rods of said water stopper until said retaining washer is embedded into said grooves of said base rods.

5. A faucet connector device as recited in claim 1, in which said driving shaft is a hollow cylindrical body having an axial through hole and has a plurality of longitudinal slots on its surface extending from the smaller end of said stopper head to near the free end portion of said driving shaft.

6. A faucet connector device as recited in claim 5, further comprising a pushing seat which has a central circular hole and at least two arrow shaped legs protruding from one side symmetrically towards said connector body, each of said legs having an outer surface and defining a groove at said outer surface for receiving said retaining washer, wherein said retaining washer is inserted into said grooves at said legs of said pushing seat which is pushed through said outlet end opening of said connector body until said pushing seat is contact with said water stopper and said legs is embedded into said respective longitudinal slots of said water stopper.

* * * * *